United States Patent
Chandler et al.

(10) Patent No.: US 9,361,165 B2
(45) Date of Patent: Jun. 7, 2016

(54) AUTOMATED MERGER OF LOGICALLY ASSOCIATED MESSAGES IN A MESSAGE QUEUE

(75) Inventors: Allan T. Chandler, Perth (AU); Bret W. Dixon, West Perth (AU)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 12/630,391

(22) Filed: Dec. 3, 2009

(65) Prior Publication Data

US 2011/0138400 A1 Jun. 9, 2011

(51) Int. Cl.
*G06F 9/54* (2006.01)

(52) U.S. Cl.
CPC .......... *G06F 9/546* (2013.01); *G06F 2209/548* (2013.01)

(58) Field of Classification Search
None
See application file for complete search history.

(56) References Cited

U.S. PATENT DOCUMENTS

| | | | | |
|---|---|---|---|---|
| 4,920,484 | A * | 4/1990 | Ranade | 709/245 |
| 5,452,453 | A * | 9/1995 | Ando et al. | 717/104 |
| 5,822,523 | A * | 10/1998 | Rothschild et al. | 709/236 |
| 5,917,489 | A * | 6/1999 | Thurlow et al. | 715/809 |
| 6,425,017 | B1 * | 7/2002 | Dievendorff et al. | 719/315 |
| 6,658,596 | B1 * | 12/2003 | Owen et al. | 714/16 |
| 6,829,604 | B1 * | 12/2004 | Tifft | 707/707 |
| 2002/0013853 | A1 * | 1/2002 | Baber et al. | 709/232 |
| 2002/0062368 | A1 * | 5/2002 | Holtzman et al. | 709/224 |
| 2002/0138582 | A1 * | 9/2002 | Chandra et al. | 709/206 |
| 2003/0011023 | A1 | 1/2003 | Hurley | |
| 2003/0110230 | A1 * | 6/2003 | Holdsworth et al. | 709/207 |
| 2003/0110397 | A1 * | 6/2003 | Supramaniam et al. | 713/201 |
| 2003/0135556 | A1 * | 7/2003 | Holdsworth | 709/206 |
| 2003/0135735 | A1 * | 7/2003 | Marejka et al. | 713/171 |
| 2003/0177259 | A1 * | 9/2003 | Wookey et al. | 709/237 |
| 2003/0212738 | A1 * | 11/2003 | Wookey et al. | 709/203 |
| 2004/0008678 | A1 * | 1/2004 | Matthews et al. | 370/389 |
| 2004/0027999 | A1 * | 2/2004 | Casaccia et al. | 370/312 |
| 2004/0254945 | A1 * | 12/2004 | Schmidt et al. | 707/100 |
| 2005/0086384 | A1 * | 4/2005 | Ernst | 709/248 |
| 2005/0138081 | A1 * | 6/2005 | Alshab et al. | 707/200 |
| 2005/0198127 | A1 | 9/2005 | Helland et al. | |
| 2006/0075039 | A1 * | 4/2006 | Narayanaswami et al. | 709/206 |

(Continued)

FOREIGN PATENT DOCUMENTS

| | | |
|---|---|---|
| JP | H06-161919 | 6/1994 |
| JP | 2000-353153 | 12/2000 |

(Continued)

*Primary Examiner* — Shih-Wei Kraft

(74) *Attorney, Agent, or Firm* — Steven M. Greenberg, Esq.; CRGO Law

(57) ABSTRACT

Embodiments of the invention provide a method, system and computer program product for message merging in a messaging queue. In an embodiment of the invention, a method for message merging in a messaging queue can be provided. The method can include receiving a request to add a new message to a message queue in a message queue manager executing in memory by a processor of a host computing platform. The method can also include a merge indicator to stipulate whether or not a merge should take place. The method also can include identifying an association key associating the new message with an existing message in the message queue and locating an associated message in the message queue corresponding to the identified association key. Finally, the method can include merging the new message with the located associated message in the message queue.

9 Claims, 2 Drawing Sheets

(56) References Cited

U.S. PATENT DOCUMENTS

| | | | |
|---|---|---|---|
| 2006/0109857 A1* | 5/2006 | Herrmann | 370/412 |
| 2006/0129660 A1* | 6/2006 | Mueller et al. | 709/220 |
| 2007/0067567 A1 | 3/2007 | Jiao et al. | |
| 2008/0155043 A1* | 6/2008 | Atsumi et al. | 709/206 |
| 2008/0189376 A1* | 8/2008 | Bice et al. | 709/206 |
| 2008/0212602 A1* | 9/2008 | Hobbs et al. | 370/428 |
| 2008/0288432 A1* | 11/2008 | Malik et al. | 706/47 |
| 2009/0063360 A1* | 3/2009 | Callaway et al. | 705/36 R |
| 2010/0318673 A1* | 12/2010 | Kemp et al. | 709/232 |

FOREIGN PATENT DOCUMENTS

| | | |
|---|---|---|
| JP | 2001-160014 | 6/2001 |
| WO | WO2009/032493 | 3/2009 |

\* cited by examiner

AUTOMATED MERGER OF LOGICALLY ASSOCIATED MESSAGES IN A MESSAGE QUEUE

BACKGROUND OF THE INVENTION

1. Field of the Invention

The present invention relates to the field of message queue management and more particularly to the programmatic association of logically associated messages in a message queue.

2. Description of the Related Art

In the field of information technology, a message queue is a software-engineering component used for inter-process communications or inter-thread communications. The component employs a queue into which messages can be placed by a messenger and from which messages can be retrieved by a designated recipient. In this regard, the message queue can be a communicative component enabling asynchronous messaging as between the messenger and the designated recipient. Operationally, the message queue can support multiple messengers and recipients such that asynchronous communications can be achieved for a group of participants.

The asynchronous nature of the message queue provides for an ideal technology coupler for disparate technologies. Specifically, so long as separate technologies can access the message queue, the separate and disparate technologies can engage in message passing thereby enabling communications. In particular, the message queue can expose different method calls through an application programming interface (API) for opening, writing to, reading from, and closing the message queue. Each application in turn can include logic to invoke a sequence of the method calls in order to either place a message into the message queue, or to retrieve a message from the message queue. Specifically, in operation, upon request, the API can search a message queue for an available message and can return the same to the requesting logic.

Generally, messages are placed on message queues by one or more applications for the purpose of being processed by other applications. Messages can be processed as the messages arrive on a message queue, or messages can accumulate to be processed at a later time. In the latter circumstance, accumulated messages can be logically associated where appropriate. For example, messages pertaining to the same subject matter can be logically associated by the common subject matter such as messages pertaining to financial operations on the same account, or messages pertaining to contact management operations for the same person.

Typically, when logically associated messages in a message queue are processed by an application, each message in the message queue is processed independently of other messages in the message queue. In this regard, to the extent each message in the message queue pertains to a transaction to be performed by the application, each transaction is performed responsive to the retrieval of a corresponding message from the message queue irrespective of any other transaction corresponding to any other message remaining in the message queue. Alternatively, an application can pre-process all messages in the message queue to identify logically associated messages, and can perform a merge of the identified logically associated messages prior to processing the merged messages.

Notwithstanding, the skilled artisan will recognize that it remains the responsibility of the application either to process the messages in the message queue individually, even when the messages are logically associated, or to perform a merge of logically associated messages to resolve logical associations prior to processing the merged messages. In either circumstance, additional computer processing will be required adding complexity and processing time to application programs.

BRIEF SUMMARY OF THE INVENTION

Embodiments of the present invention address deficiencies of the art in respect to message queue management and provide a novel and non-obvious method, system and computer program product for message merging in a messaging queue. In an embodiment of the invention, a method for message merging in a messaging queue can be provided. The method can include receiving a request to add a new message to a message queue in a message queue manager executing in memory by a processor of a host computing platform. The method also can include identifying an association key associating the new message with an existing message in the message queue and locating an associated message in the message queue corresponding to the identified association key. Finally, the method can include merging the new message with the located associated message in the message queue.

In another embodiment of the invention, a message queueing data processing system can be provided. The system can include a host computing platform including memory and at least one processor. The system further can include a message queue coupled to the host computing platform and a message queue manager coupled to the message queue and executing by the processor in the memory of the host computing platform. The system yet further can include a message merge module coupled to the message queue manager. The module can include program code enabled upon execution while in memory by a processor of a computer to identify in a request to add a new message to the message queue received by the message queue manager, an association key associating the new message with an existing message in the message queue, to locate an associated message in the message queue corresponding to the identified association key, and to merge the new message with the located associated message in the message queue.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for the automated merging of logically associated messages. In an embodiment of the invention, messages can be received for placement in a message queue. An indication of whether or not to merge a received message can be determined, for instance by reference to a parameter included with a directive to place the message onto the message queue, by way of an environment variable, with reference to data in a message header for the message, or data embedded within the message itself. If it is determined to merge the received message, an association key for associating the received message with another message in the message queue can be used to establish an association between the two messages using data in the message headers and/or the message data. In this way, the number of messages in the message queue can be reduced through merging associated messages.

Figure 1:
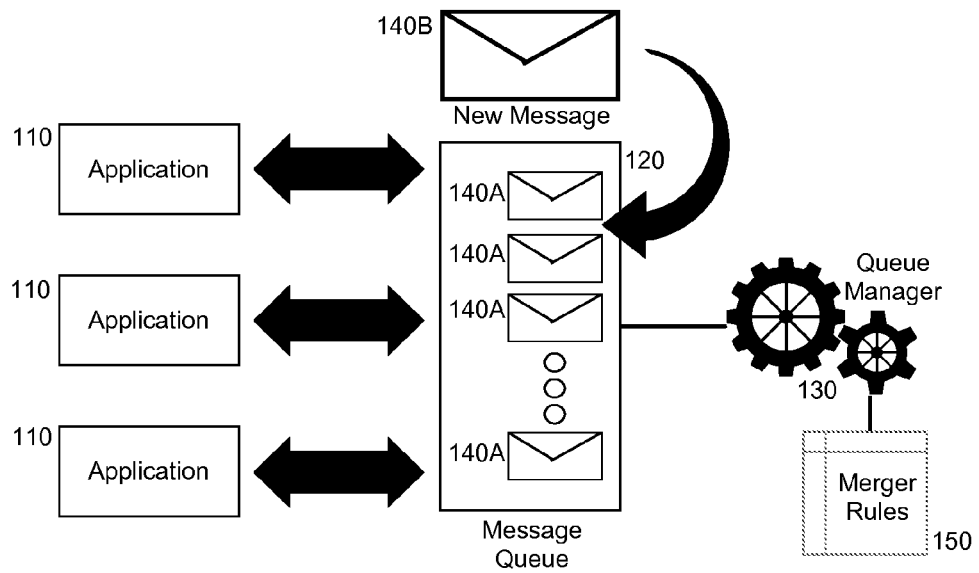
FIG. 1 is a pictorial illustration of a process for logically merging queued messages in a message queue.

In further illustration, FIG. 1 pictorially depicts a process for logically merging queued messages in a message queue. As shown in FIG. 1, one or more applications 110 can utilize a message queue 120 for exchanging application messages 140A in the message queue 120. A queue manager 130 can manage the posting of messages 140A by the applications 110 onto the message queue 120 and the removing of messages 140A by the applications 110 from the message queue 120 for processing in the applications 110. Of note, as a given one of the applications 110 requests addition of a message 140B onto the message queue 120 by the queue manager 130, the queue manager 130 can determine whether or not the message 140B is to be merged with another associated one of the messages 140A already resident in the message queue 120. If so, the queue manager 130 both can identify a particular one of the messages 140A in the message queue 120 associated with the message 140A and also the queue manager 130 can perform a merger of the message 140B with the associated one of the messages 140A based upon a selected one of merger rules 150.

Once the selected one of the merger rules 150 has been applied, the content of the message 140B can be merged with the associated one of the messages 140A in the message queue and the message 140B otherwise can be discarded. Alternatively, the content of the associated one of the messages 140A can be merged with the message 140B and the associated one of the messages 140A can be removed from the message queue 120 and discarded. As yet another alternative, the content of the message 140B and the content of the associated one of the messages 140A in the message queue can be combined into a new message and placed into the message queue 120. In any event, the merger of the message 140B with the associated one of the messages 140A in the message queue 120 can be performed by the queue manager 130 without unnecessarily burdening the applications 110.

Figure 2:
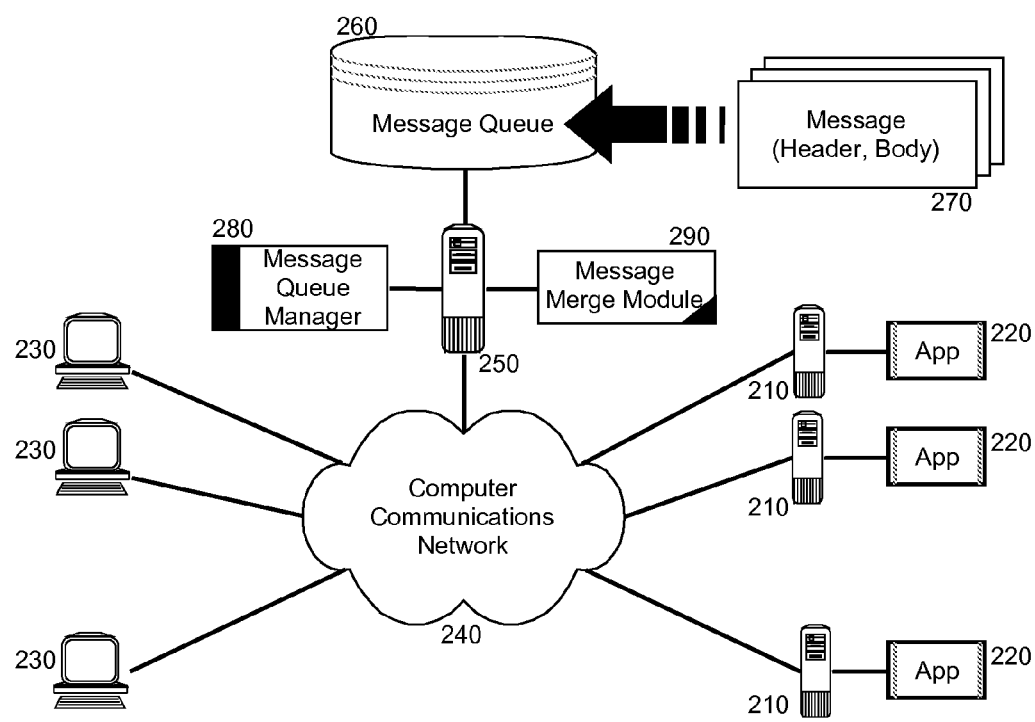
FIG. 2 is a schematic illustration of a message queuing data processing system configured for logically merging queued messages in a message queue; and, FIG. 3 is a flow chart illustrating a process for logically merging queued messages in a message queue.

The process described in connection with FIG. 1 can be implemented in a message queuing data processing system. In yet further illustration, FIG. 2 is a schematic illustration of a message queuing data processing system configured for logically merging queued messages in a message queue. The system can include one or more servers 210, each including one or more processors, memory and an operating system, each of the servers 210 hosting the execution of one or more applications 220. One or more of the applications 220 can be accessed through end user client computing devices 230 over computer communications network 240. Further, individual ones of the servers 210 can be communicatively coupled to one another over the computer communications network 240.

A host computing platform 250 with memory and at least one processor also can be communicatively coupled to the servers 210 over the computer communications network 240. The host computing platform 250 can support the operation of a message queue 260 managed by message queue manager 280. In this regard, the message queue manager 280 can be a computer program executing in the memory by one or more of the processors of the host computing platform 250 and managing access to messages 270 in the message queue 260 by different ones of the applications 220 from over the computer communications network 240. Further, each of the messages 270 in the message queue 260 can include content expressed in a body of the message as well as a header portion, as it is well known in the art, for use by the message queue manager 280 in determining how to process a corresponding one of the messages 270 with respect to the message queue 260.

A message merge module 290 can be coupled to the message queue manager 280 or be a component of the message queue manager 280. The message merge module 290 can include program code that when executed by a processor while loaded into memory of a computer can manage the logical merger of selected ones of the messages 270 in the message queue 260. In this regard, the message merge module 290 can execute as program code in the memory of the host computing platform 250 or within the memory of a different computing platform communicatively coupled to the host computing platform 250 directly or from over the computer communications network 240.

The program code of the message merge module 290 when executed by a processor in memory of a computer can identify requests by the applications 220 to place messages into the message queue 260. For each of the requests, the program code can determine whether or not a logical merger is preferred for a message with respect to an existing one of the messages 270 in the message queue 260. This determination can be based upon data stored in the header of the message, in the body of the message, or in a parameter stored for the message queue 260, itself, or data passed as a parameter by the application program interface, or data that is available as an environment variable accessible by the message merge module 290. For each request corresponding to a message to be logically merged with respect to an existing one of the messages 270 in the message queue 260, the program code can locate the existing one of the messages 270 in the message queue 260 and can apply a merge rule for the located existing one of the messages 270 and the corresponding message in the request. Finally, the program code can store each merged message in the message queue 260.

Figure 3:
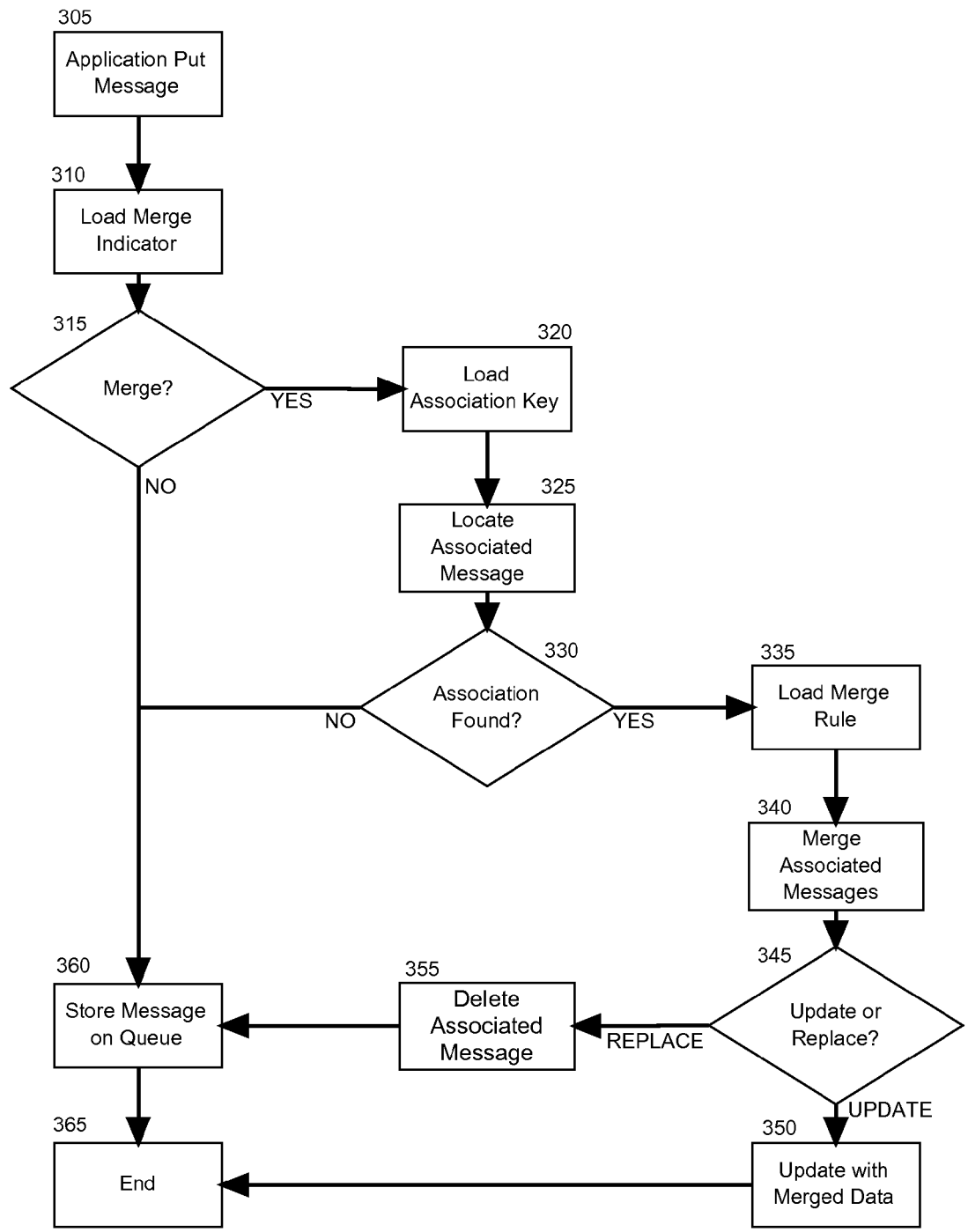

In even yet further illustration of the operation of the message merge module 290, FIG. 3 is a flow chart illustrating a process for logically merging queued messages in a message queue. Beginning in block 305, an application put request can be received for a message that can include both a message body and a message header. The request further can include one or more parameters, such as an indication of whether the message is to be logically merged with an existing message in the message queue, and if so, an association key corresponding to the existing message. In alternative aspects of the embodiment, however, the parameters can be provided as part of the message header, as part of the content of the message body, as attributes of the message queue, as environment variables, as content of a queue message, or as content in a file or database.

In block 310, the merge indicator, if any, can be loaded for the message. In decision block 315, it can be determined whether or not a logical merge is preferred for the message. To the extent that a logical merge is not preferred for the message, in block 360 the message can be stored in the message queue and the process can end in block 365. Otherwise, if a logical merge is preferred as determined in decision block 315, in block 320 an association key can be loaded for the message and an associated message in the message queue can be located with the association key in block 325. The association key can be a parameter or parameters of the initial request, as part of the message header, as part of the content of the message body, as attributes of the message queue, as environment variables, as content of a queue message, as content in a file or database, as a queue manager attribute, as part of a queue message. In decision block 330 it can be determined if no associated message can be located in the message queue for the association key. If not, in block 360 the message can be stored in the message queue and the process can end in block 365. Otherwise, the process can continue through block 335.

In block 335, a merge rule can be loaded for merging the message with the located associated message in the message queue. The merge rule can include a description of relevant data in each message and how the relevant data is to be combined in a single message. For example, the merge rule can provide a markup language mapping of data in each message to one another and a directive to merge the data into a position in the merged message. As another example, the merge rule can be an executable script or program to perform the physical merger of the data of both messages into a single message. Optionally, the merge rule can be specified on a message by message basis, or the message merge module can be configured to use a particular merge rule. As another option, the merge rule can specify whether or not the message is to replace the located associated message in the queue in a modified form resulting from a merger of both messages, or whether or not the located associated message is to be updated in a modified form resulting from a merger of both messages.

In block 340, the messages can be merged according to the merge rule and in decision block 345, it can be determined whether or not the message is to replace the located associated message in the queue in a modified form resulting from a merger of both messages, or whether or not the located associated message is to be updated in a modified form resulting from a merger of both messages. If the former, in block 355 the located associated message can be removed from the message queue and in block 360 the merged form of the message can be added to the message queue. If the latter, in block 350 the located associated message can be updated with the merged data and in block 365 the process can end.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A message queueing data processing system comprising:
    a host computing platform comprising memory and at least one processor;
    a message queue coupled to the host computing platform;
    a message queue manager coupled to the message queue and executing by the processor in the memory of the host computing platform; and,
    a message merge module coupled to the message queue manager, the module comprising program code enabled upon execution while in memory by a processor of a computer to identify in a request to add a new message to the message queue received by the message queue manager, an association key associating the new message with an existing message in the message queue, to locate an associated message in the message queue corresponding to the identified association key, and to merge the new message with the located associated message in the message queue by loading a merge rule for the new message and the located associated message, applying the merge rule to data in each of the new message and the located associated message to produce merged data, and updating the located associated message in the message queue with the merged data while discarding the new message,
    wherein the merge rule is a separately executable computer program that has been programmed to merge the data in each of the new message and the located associated message.

2. The system of claim 1, wherein the association key is disposed in a message header for the new message.

3. The system of claim 1, wherein the association key is disposed in a parameter to the request to add the new message to the message queue received by the message queue manager.

4. The system of claim 1, wherein the association key is disposed in a body of the new message.

5. The system of claim 1, wherein the association key is disposed as attributes of the message queue.

6. The system of claim 1, wherein the association key is an environment variable.

7. The system of claim 1, wherein the association key is disposed in a file for the message queue manager.

8. A computer program product comprising a computer usable storage medium storing computer usable program code for message merging in a messaging queue, the computer program product comprising:
    computer usable program code for receiving a request to add a new message to a message queue in a message queue manager executing in memory by a processor of a host computing platform;
    computer usable program code for identifying an association key associating the new message with an existing message in the message queue;
    computer usable program code for locating an associated message in the message queue corresponding to the identified association key;
    computer usable program code for merging the new message with the located associated message in the message queue by loading a merge rule for the new message and the located associated message, applying the merge rule to data in each of the new message and the located associated message to produce merged data, and updating the located associated message in the message queue with the merged data while discarding the new message,
    wherein the merge rule is a separately executable computer program that has been programmed to merge the data in each of the new message and the located associated message.

9. The computer program product of claim 8, further comprising:

computer usable program code for determining if a merge indicator is specified for the received request;

computer usable program code for performing the identifying, locating and merging only if the merge indicator is specified for the received request; and, computer usable program code for otherwise storing the new message on the message queue without performing the identifying, locating and merging if the merge indicator is not specified for the received request.

* * * * *